United States Patent
Gonzalez et al.

(10) Patent No.: US 9,080,385 B2
(45) Date of Patent: Jul. 14, 2015

(54) BEARING ASSEMBLIES INCLUDING THICK SUPERHARD TABLES AND/OR SELECTED EXPOSURES, BEARING APPARATUSES, AND METHODS OF USE

(71) Applicant: US Synthetic Corporation, Orem, UT (US)

(72) Inventors: Jair Jahaziel Gonzalez, Provo, UT (US); Timothy N. Sexton, Genola, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 13/899,785

(22) Filed: May 22, 2013

(65) Prior Publication Data

US 2014/0348452 A1   Nov. 27, 2014

(51) Int. Cl.
*F16C 17/04* (2006.01)
*E21B 4/00* (2006.01)
*E21B 10/22* (2006.01)
(Continued)

(52) U.S. Cl.
CPC ............... *E21B 4/003* (2013.01); *F16C 33/043* (2013.01); *F16C 33/26* (2013.01); *F16C 37/002* (2013.01); *F16C 17/02* (2013.01); *F16C 17/04* (2013.01); *F16C 2206/04* (2013.01); *F16C 2206/40* (2013.01); *F16C 2206/80* (2013.01); *F16C 2240/60* (2013.01); *F16C 2352/00* (2013.01)

(58) Field of Classification Search
CPC ...... E21B 10/22; F16C 33/043; F16C 17/065; F16C 33/122; F16C 33/121; F16C 35/10

USPC ............... 384/92, 95, 121, 223, 22, 282–285, 384/293, 297, 303, 306, 420, 428, 907.1, 384/129, 308; 29/898.042; 175/371, 432, 175/434, 435

See application file for complete search history.

(56) References Cited

U.S. PATENT DOCUMENTS 1,438,053 A * 12/1922 Parsons et al. ................. 384/303
T102,901 I4 *  4/1983 Offenbacher ............ 29/898.041

(Continued)

FOREIGN PATENT DOCUMENTS

EP    1116858    7/2001
WO   WO 2004/007901  1/2004

(Continued)

OTHER PUBLICATIONS

U.S. Appl. No. 12/761,535, filed Apr. 16, 2010, Scott, et al.

(Continued)

*Primary Examiner* — Marcus Charles
(74) *Attorney, Agent, or Firm* — Dorsey & Whitney LLP

(57) ABSTRACT

Embodiments of the invention are directed to bearing assemblies configured to effectively provide heat dissipation for bearing elements, bearing apparatuses including such bearing assemblies, and methods of operating such bearing assemblies and apparatuses. In an embodiment, a bearing assembly includes a plurality of superhard bearing elements distributed about an axis. Each superhard bearing element of the plurality of superhard bearing elements has a superhard table including a superhard surface. The bearing assembly includes a support ring structure coupled to the plurality of superhard bearing elements. One or more of the superhard bearing elements includes a superhard table, which may improve heat transfer from such superhard bearing elements.

22 Claims, 8 Drawing Sheets

(51) Int. Cl.
*F16C 37/00* (2006.01)
*F16C 33/04* (2006.01)
*F16C 33/26* (2006.01)
*F16C 17/02* (2006.01)

(56) References Cited

U.S. PATENT DOCUMENTS

| | | | | |
|---|---|---|---|---|
| 4,468,138 | A * | 8/1984 | Nagel | 384/303 |
| 4,620,601 | A * | 11/1986 | Nagel | 175/107 |
| 5,092,687 | A * | 3/1992 | Hall | 384/303 |
| 6,196,341 | B1 | 3/2001 | Chaves | |
| 7,552,782 | B1 * | 6/2009 | Sexton et al. | 175/107 |
| 7,559,695 | B2 * | 7/2009 | Sexton et al. | 384/95 |
| 7,703,982 | B2 * | 4/2010 | Cooley | 384/95 |
| 7,866,418 | B2 | 1/2011 | Bertagnolli et al. | |
| 7,870,913 | B1 | 1/2011 | Sexton et al. | |
| 7,901,137 | B1 * | 3/2011 | Peterson | 175/403 |
| 7,946,768 | B2 * | 5/2011 | Cooley et al. | 384/95 |
| 7,998,573 | B2 | 8/2011 | Qian et al. | |
| 8,034,136 | B2 | 10/2011 | Sani | |
| 8,066,087 | B2 | 11/2011 | Griffo et al. | |
| 8,147,142 | B1 * | 4/2012 | Peterson | 384/92 |
| 8,236,074 | B1 | 8/2012 | Bertagnolli et al. | |
| 8,328,891 | B2 | 12/2012 | Zhang et al. | |
| 2007/0046119 | A1 * | 3/2007 | Cooley | 310/90.5 |
| 2008/0302579 | A1 * | 12/2008 | Keshavan et al. | 175/434 |
| 2009/0152018 | A1 | 6/2009 | Sani | |
| 2010/0218995 | A1 * | 9/2010 | Sexton et al. | 384/420 |
| 2010/0226759 | A1 * | 9/2010 | Cooley et al. | 384/95 |
| 2011/0017519 | A1 | 1/2011 | Bertagnolli et al. | |
| 2011/0174544 | A1 * | 7/2011 | Scott et al. | 384/420 |
| 2012/0281938 | A1 * | 11/2012 | Peterson et al. | 384/306 |

FOREIGN PATENT DOCUMENTS

| | | |
|---|---|---|
| WO | WO 2007/025117 | 3/2007 |
| WO | WO 2010/039346 | 4/2010 |

OTHER PUBLICATIONS

International Search Report and Written Opinion from International Application No. PCT/US2014/038199 mailed Sep. 19, 2014.

* cited by examiner

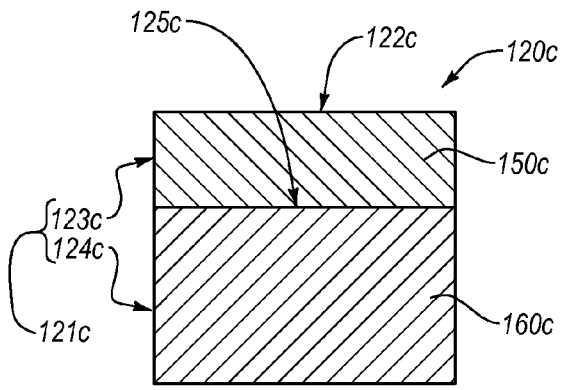
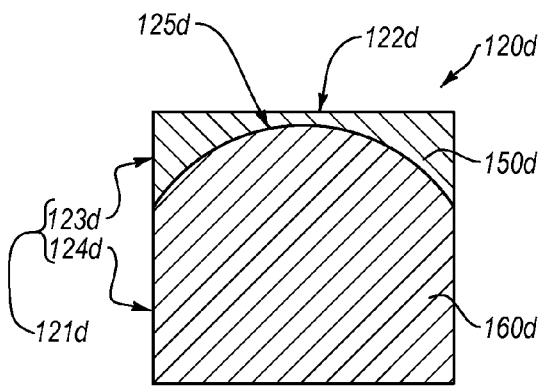
FIG. 2B          FIG. 2C
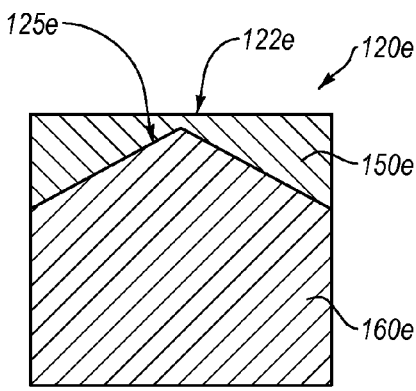
FIG. 2D
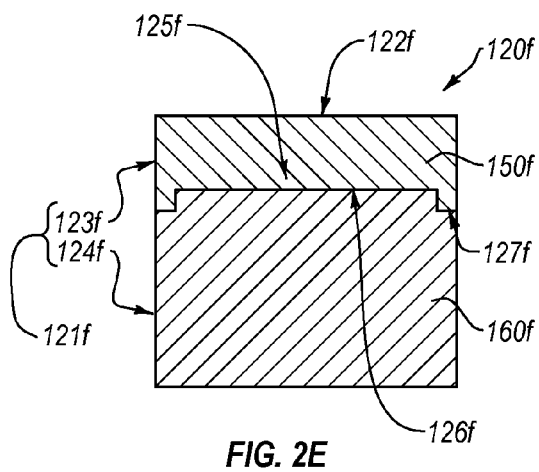
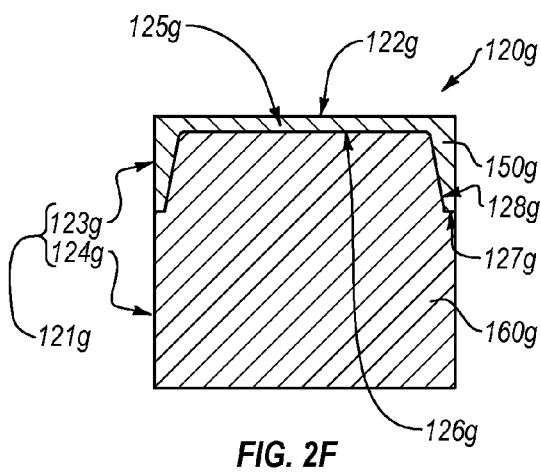
FIG. 2E          FIG. 2F

BEARING ASSEMBLIES INCLUDING THICK SUPERHARD TABLES AND/OR SELECTED EXPOSURES, BEARING APPARATUSES, AND METHODS OF USE

BACKGROUND

Subterranean drilling systems that employ downhole drilling motors are commonly used for drilling boreholes in the earth for oil and gas exploration and production. A subterranean drilling system typically includes a downhole drilling motor that is operably connected to an output shaft. Bearing apparatuses (e.g., thrust, radial, tapered, and other types of bearings) also may be operably coupled to the downhole drilling motor. A rotary drill bit configured to engage a subterranean formation and drill a borehole is connected to the output shaft. As the borehole is drilled with the rotary drill bit, pipe sections may be connected to the subterranean drilling system to form a drill string capable of progressively drilling the borehole to a greater depth within the earth.

A typical bearing apparatus includes a stator that does not rotate and a rotor that is attached to the output shaft and rotates with the output shaft. The stator and rotor each includes a plurality of bearing elements, which may be fabricated from polycrystalline diamond compacts ("PDCs") that provide diamond bearing surfaces that bear against each other during use.

The operational lifetime of the bearing apparatuses often determines the useful life of the subterranean drilling system. Therefore, manufacturers and users of subterranean drilling systems continue to seek improved bearing apparatuses to extend the useful life of such bearing apparatuses.

SUMMARY

Embodiments of the invention are directed to bearing assemblies configured to effectively provide heat dissipation for bearing elements, bearing apparatuses including such bearing assemblies, and methods of operating such bearing assemblies and apparatuses. In an embodiment, a bearing assembly includes a plurality of superhard bearing elements distributed about an axis. Each superhard bearing element of the plurality of superhard bearing elements has a superhard table including a superhard surface. The bearing assembly includes a support ring structure coupled to the plurality of superhard bearing elements. One or more of the superhard bearing elements includes a superhard table, which may improve heat transfer from such superhard bearing elements.

In an embodiment, a bearing assembly includes a first plurality of superhard bearing elements distributed about an axis. Each of the first plurality of superhard bearing elements has a superhard material including a superhard bearing surface. The bearing assembly also includes a support ring structure coupled to the first plurality of superhard bearing elements. Additionally, the superhard material of at least some of the first plurality of superhard bearing elements has a maximum thickness that is at least 0.120".

In one or more embodiments, a bearing apparatus includes a first bearing assembly, which includes one or more first bearing surfaces and a first support ring structure that includes the one or more first bearing surfaces. The bearing assembly also includes a second bearing assembly, which includes a second plurality of superhard bearing elements. Each of the second plurality of superhard bearing elements including superhard material having a second superhard bearing surface positioned and oriented to slidingly engage the one or more first bearing surfaces of the first bearing assembly. The second bearing assembly also includes a second support ring structure that carries the second plurality of superhard bearing elements. In addition, the superhard material of at least some of the second plurality of superhard bearing elements has a thickness that is at least 0.120".

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

FIG. 2B is a cross-sectional view of a bearing element according to an embodiment;

FIG. 2C is a cross-sectional view of a bearing element according to another embodiment;

FIG. 2D is a cross-sectional view of a bearing element according to yet one other embodiment;

FIG. 2E is a cross-sectional view of a bearing element according to an embodiment;

FIG. 2F is a cross-sectional view of a bearing element according to still another embodiment;

DETAILED DESCRIPTION

Figure 1A:
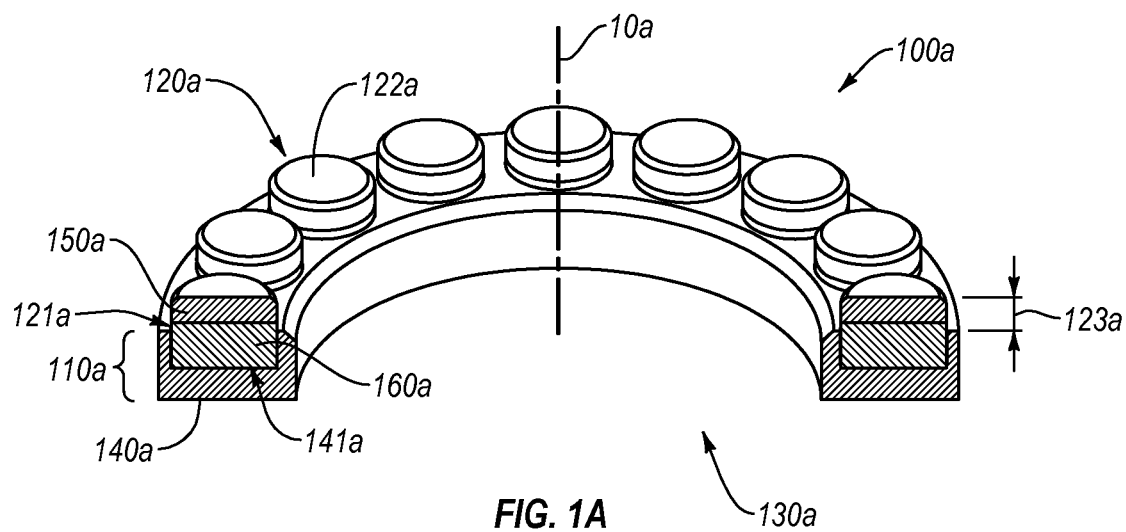
FIG. 1A is a cross-sectional view of a thrust-bearing assembly according to an embodiment.

Embodiments of the invention are directed to bearing assemblies configured to effectively provide heat dissipation for bearing elements, bearing apparatuses including such bearing assemblies, and methods of operating such bearing assemblies and apparatuses. In particular, one or more embodiments include a bearing apparatus, which may include first and second bearing assemblies (e.g., a stator and a rotor) configured to engage one another, and any of which may provide heat dissipation from the bearing elements that may comprise the first and/or second bearing assemblies.

For instance, some or all of the bearing elements of the first and/or second bearing assemblies may be superhard bearing elements. As used herein, a "superhard bearing element" is a bearing element including a bearing surface that is made from a material exhibiting a hardness that is at least as hard as tungsten carbide. In any of the embodiments disclosed herein, the superhard bearing elements may include one or more superhard materials, such as polycrystalline diamond, polycrystalline cubic boron nitride, silicon carbide, tungsten carbide, or any combination of the foregoing superhard materials. In an embodiment, the superhard bearing elements may include a superhard table, which may be highly thermally conductive. Furthermore, in some instances, the superhard table may be a superhard table, which may provide increased transfer of heat from the superhard bearing elements (as compared with a standard superhard table). Specifically, such superhard bearing elements may have increased surface areas that may be exposed to a cooling medium, such as drilling fluid, coolant, air, etc., which may facilitate efficient convective heat transfer from the bearing elements.

It should be appreciated that, typically, a manufacturer may prefer to limit the thickness of the superhard table (e.g., to about less than 0.080"). For instance, increased thickness of the superhard table, such as polycrystalline diamond compact table, may increase manufacturing costs. According to principals of this disclosure, however, as described further below, superhard table of the bearing elements may increase useful life/performance of the bearing assemblies and/or of the bearing apparatus, by facilitating efficient heat dissipation. Furthermore, such superhard tables of the bearing elements may increase a maximum load that the bearing assemblies and apparatuses (e.g., by increasing convective heat transfer from the bearing elements and preventing overheating thereof) can experience during use without failure.

Limiting protruding portions of the bearing elements in the standard bearing assembly may be aimed at reducing moment and/or shear forces experienced by such bearing elements. To provide sufficient exposure to the cooling medium, in an embodiment, the bearing elements described herein may protrude from the support ring structure in excess to bearing elements associated as compared with the standard bearing elements and/or bearing assemblies. In addition to or in lieu of over-protruding, the bearing elements may include the superhard table, which may improve or increase heat transfer from the bearing elements, as compared with the bearing elements of the typical bearing assembly. According to the present disclosure, any negative effects to performance of the bearing due to increased forces that may be experienced by the bearing elements (i.e., forces applied to bearing surfaces) may be compensated for by increased efficiency in transferring heat from the bearing elements. Moreover, under some operating conditions, increased heat transfer efficiency may lead to increased load bearing capacity of the bearing assemblies and apparatuses.

Heating of the bearing elements above a certain temperature may degrade or damage the superhard material of the superhard table of the bearing elements. Under some operational conditions, increased load on the bearing apparatus, on the bearing assembly, and/or on particular bearing elements may lead to a corresponding increase in temperature. In an embodiment, any of the configuration, design, position, or combinations thereof of the superhard table and/or of the bearing elements may prevent the temperature from increasing to or above a detrimental temperature that may damage or degrade the superhard table. Particularly, as noted above, the superhard table of such bearing elements may facilitate sufficient cooling of the superhard table by the cooling medium, which may reduce increases in temperature of the superhard table during use.

Also, in some operational conditions, one or more of the bearing elements may be preferentially loaded, such as to carry preferentially higher loads (e.g., radial and/or axial loads). The bearing elements experiencing higher loads also may experience a higher thermal load or may heat up at an accelerated rate, as compared with other bearing elements. Hence, an embodiment optionally includes bearing assemblies and/or bearing apparatuses that include higher loaded bearing elements that incorporate a superhard table. Furthermore, the higher loaded bearing elements may optionally be over-protruding relative to a support ring structure of the bearing assembly. Thus, in some embodiments, the superhard table thickness and/or protrusion of higher loaded bearing elements may be selected, alone or in combination, to maintain a desired operating temperature of the higher loaded bearing elements during use.

Also, accelerated and/or uneven heating or thermal loading of the bearing elements may lead to premature failure of the bearing assembly. For instance, thermal expansion of the high-load bearing elements may further increase forces and/or friction experienced by one or more of such bearing elements. In some instances, increased force on the bearing elements may lead to deformation and/or fracturing of the bearing assembly and/or component or elements thereof. In any case, accelerated and/or uneven heating of the bearing elements may prematurely cause damage thereto (e.g., by damaging or degrading the superhard material that may comprise such bearing elements), which may lead to the failure of the bearing assembly. Accordingly, enhanced cooling of the higher loaded bearing elements may limit or prevent premature failure of the bearing assembly.

In some instances, the bearing assembly may receive and/or generate more heat in or near a first portion thereof (e.g., a portion under a higher load), which may increase the temperature in the first portion of the bearing assembly, while the temperature in a second portion of the bearing assembly may remain at a lower temperature. Such uneven temperature distribution may warp the bearing assembly. Furthermore, in some situations, warping may inhibit or prevent hydrodynamic operation of the bearing apparatus and/or may unevenly load the bearing elements. In an embodiment, over-protruding bearing elements and/or bearing elements with superhard table may be positioned in or near the first portion of the bearing assembly to provide enhanced heat dissipation at the first portion of the bearing assembly, which may extend useful life of the bearing assembly.

FIG. 1A illustrates a thrust-bearing assembly 100a according to an embodiment. The thrust-bearing assembly 100a may include a support ring structure 110a that carries superhard bearing elements 120a. The support ring structure 110a may form or define the opening 130a therein. In some embodiments, the opening 130a may have a substantially circular or cylindrical shape. Alternatively, the opening 130a may have any number of suitable shapes, which may vary from one embodiment to another. In any case, the opening 130a may accommodate a shaft or other machine component or element that may pass therethrough and/or may be secured thereto. Furthermore, in an embodiment, the support ring structure 110a may have no opening.

Additionally, the support ring structure 110a may form or define an outer perimeter of the thrust-bearing assembly support ring structure 110a. Similar to the opening 130a, the outer perimeter formed by the support ring structure 110a also may have any number of suitable shapes. In an embodiment, the outer perimeter has a substantially circular shape. In other embodiments, however, the outer perimeter may have a rectangular, triangular, trapezoidal, or essentially any other shape.

In an embodiment, the support ring structure 110a may include a support ring 140a that may secure and support the superhard bearing elements 120a. The superhard bearing elements 120a may be secured to the support ring structure 110a in any number of suitable ways that may vary from one embodiment to the next. For instance, the superhard bearing elements 120a may be at least partially secured within recesses 141a via brazing, press-fitting, threadedly attaching, fastening with a fastener, combinations of the foregoing, or another suitable technique. The recesses 141a may be located in and/or defined by the support ring 140a.

The superhard bearing elements 120a may have any number of suitable arrangements on the support ring structure 110a, which may vary from one embodiment to another. For example, the superhard bearing elements 120a may be circumferentially positioned about a thrust axis 10a on the support ring structure 110a. Moreover, the superhard bearing elements 120a may be arranged in a single row about the support ring structure 110a. In additional or alternative embodiments, the superhard bearing elements 120a may be distributed in two rows, three rows, four rows, or any other number of rows.

The support ring 140a may include a variety of different materials or combinations of materials. For example, the support ring 140a may include a metal, alloy steel, a metal alloy, carbon steel, stainless steel, tungsten carbide, or combinations thereof. As further described below, various portions of the support ring structure 110a (e.g., the support ring 140a) may include any number of other suitable or conductive, non-conductive, or semiconductive materials. In any event, the support ring 140a may include a suitable material, having sufficient strength and resilience to support the superhard bearing elements 120a.

In additional or alternative embodiments, the support ring structure 110a may include multiple elements or components coupled or secured together. For instance, the support ring structure may include a support ring and a retaining ring coupled to the support ring. Such retaining ring may include counterbored or countersunk openings that may facilitate securing the bearing elements to the support ring structure. For example, in one embodiment, the bearing elements may include a shoulder that may interface with the counterbore or countersink of the openings in the retaining ring of the support ring structure, which may allow the retaining ring to secure the bearing elements to the support ring. In turn, the retaining ring may be fastened (e.g., bolted, screwed, etc.), welded, brazed, or otherwise secured to the support ring. In any event, the support ring structure 110a may secure, as well as provide sufficient support, to the superhard bearing elements 120a. Embodiments of support ring structures including a retaining ring coupled to a support ring to retain superhard bearing elements are disclosed in U.S. Pat. No. 7,870,913 and U.S. application Ser. No. 12/761,535, the disclosures of both of which are incorporated herein, in their entirety, by this reference.

The superhard bearing elements 120a may include one or more surfaces that form a peripheral surface 121a of the superhard bearing elements 120a. Generally, the shape of the peripheral surface 121a and/or size of the superhard bearing elements 120a may vary from one embodiment to another. For example, the superhard bearing elements 120a may have a substantially cylindrical peripheral surface 121a. In one or more embodiments, the superhard bearing elements 120a may have a cuboid, conical, prismoid, complex peripheral surfaces, or any desired shape.

In one or more embodiments, the superhard bearing elements 120a may be pre-machined to selected tolerances and mounted in the support ring structure 110a. Optionally, the superhard bearing elements 120a may be first mounted in the support ring structure 110a and then planarized (e.g., by grinding and/or lapping) to form bearing surfaces 122a thereof, so that the bearing surfaces 122a are substantially coplanar. Optionally, one or more of the superhard bearing elements 120a may have a peripherally extending edge chamfer.

In some embodiments, the superhard bearing elements 120a may include a superhard table 150a bonded to a substrate 160a. For example, the superhard table 150a may comprise polycrystalline diamond and the substrate 160a may comprise cobalt-cemented tungsten carbide. Other carbide materials may be used with tungsten carbide or as an alternative, such as chromium carbide, tantalum carbide, vanadium carbide, titanium carbide, or combinations thereof cemented with iron, nickel, cobalt, or alloys thereof. Furthermore, in any of the embodiments disclosed herein, the polycrystalline diamond table may be leached to at least partially remove or substantially completely remove a metal-solvent catalyst (e.g., cobalt, iron, nickel, or alloys thereof) that was used to initially sinter precursor diamond particles to form the polycrystalline diamond. In another embodiment, an infiltrant used to re-infiltrate a preformed leached polycrystalline diamond table may be leached or otherwise removed to a selected depth from a bearing surface. Moreover, in any of the embodiments disclosed herein, the polycrystalline diamond may be un-leached and include a metal-solvent catalyst (e.g., cobalt, iron, nickel, or alloys thereof) that was used to initially sinter the precursor diamond particles that form the polycrystalline diamond and/or an infiltrant used to re-infiltrate a preformed leached polycrystalline diamond table. Examples of methods for fabricating the superhard bearing elements and superhard materials and/or structures from which the superhard bearing elements may be made are disclosed in U.S. Pat. Nos. 7,866,418; 7,998,573; 8,034,136; and 8,236,074; the disclosure of each of the foregoing patents is incorporated herein, in its entirety, by this reference.

The diamond particles that may be used to fabricate the superhard table 150a in a high-pressure/high-temperature process ("HPHT") may exhibit a larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the diamond particles may include a portion exhibiting a relatively larger size (e.g., 70 µm, 60 µm, 50 µm, 40 µm, 30 µm, 20 µm, 15 µm, 12 µm, 10 µm, 8 µm) and another portion exhibiting at least one relatively smaller size (e.g., 15 µm, 12 µm, 10 µm, 8 µm, 6 µm, 5 µm, 4 µm, 3 µm, 2 µm, 1 µm, 0.5 µm, less than 0.5 µm, 0.1 µm, less than 0.1 µm). In an embodiment, the diamond particles may include a portion exhibiting a relatively larger size between about 10 µm and about 40 µm and another portion exhibiting a relatively smaller size between about 1 µm and 4 µm. In another embodiment, the diamond particles may include a portion exhibiting the relatively larger size between about 15 µm and about 50 µm and another portion exhibiting the relatively smaller size between about 5 µm and about 15 μm. In another embodiment, the relatively larger size diamond particles may have a ratio to the relatively smaller size diamond particles of at least 1.5. In some embodiments, the diamond particles may comprise three or more different sizes (e.g., one relatively larger size and two or more relatively smaller sizes), without limitation. The resulting polycrystalline diamond formed from HPHT sintering the aforementioned diamond particles may also exhibit the same or similar diamond grain size distributions and/or sizes as the aforementioned diamond particle distributions and particle sizes. Additionally, in any of the embodiments disclosed herein, the superhard bearing elements may be free-standing (e.g., substrateless) and optionally may be at least partially or fully leached to remove a metal-solvent catalyst initially used to sinter the polycrystalline diamond body.

In some instances, high thermal load on one or more of the superhard bearing elements 120a may produce temperatures that may degrade and/or deteriorate associated one or more superhard tables 150a. For example, at temperatures of above around 700° C., the polycrystalline diamond may degrade under certain operating conditions, which may lead to the failure of the superhard bearing elements 120a and, thus, of the thrust-bearing assembly support ring structure 110a. Therefore, maintaining the operating temperature of the superhard bearing elements 120a below detrimental temperature, such as by providing increased surface area of the superhard table 150a that may be exposed to the cooling medium may increase useful life of the thrust-bearing assembly support ring structure 110a.

For instance, the superhard table 150a may have a maximum thickness (i.e., a height of the superhard table 150a protruding above the substrate 160a) of between about 0.100" and about 0.140"; between about 0.120" and about 0.187"; between about 0.120" and about 0.312"; between about 0.156" and about 0.250"; or between about 0.250" and about 0.312". In additional or alternative embodiments, the superhard table 150a may have a maximum thickness that is greater than about 0.312" or less. In some embodiments, the superhard table 150a may have a maximum thickness that is greater than about 0.1", greater than about 0.2", greater than about 0.3", greater than about 0.4", greater than about 0.5", about 0.50" to about 0.75", or greater than about 0.75". In other words, the height of one or more of the superhard bearing elements 120a may be comprised entirely of the superhard table 150a (i.e., the superhard bearing elements 120a may have no substrate 160a). On the one hand, increasing the thickness superhard table 150a may increase the efficiency of transferring heat from the superhard bearing elements 120a, which may lead to an increased load-bearing capacity of the thrust-bearing assembly 100a. On the other hand, increasing the thickness of superhard table 150a may be costly and/or may increase moment and/or shear forces experienced by the superhard bearing elements 120a (e.g., by the superhard table 150a relative to the substrate 160a). Accordingly, a maximum thickness of the superhard table 150a may vary from one embodiment to the next. More specifically, among other things, a maximum thickness of the superhard table 150a may depend on the overall size of the thrust-bearing assembly 100a and/or of the superhard bearing elements 120a, particle size and/or density of the polycrystalline diamond, load requirements, and the like.

In one or more embodiments, the superhard table 150a may have the maximum thickness at and/or near a peripheral surface 121a of the superhard bearing elements 120a. For example, the superhard table 150a may form or define a portion of the peripheral surface 121a of the superhard bearing elements 120a at the location of the maximum thickness of the superhard table 150a. Accordingly, increasing the maximum thickness of the superhard table 150a may increase the portion of the peripheral surface 121a that is formed or defined by the superhard table 150a, which may increase the overall exposure of the superhard table 150a to the cooling medium.

More specifically, cooling medium may at least partially surround the portion of the superhard bearing elements 120a that protrudes above the support ring structure 110a, thereby cooling the superhard bearing elements 120a. In one or more embodiments, the superhard table 150a may have a relative high thermal conductivity (e.g., the superhard table 150a may include polycrystalline diamond that may have thermal conductivity of about 500 W/m·K or more). Accordingly, it is believed that the heat generated at the bearing surface 122a of the superhard bearing elements 120a may be transferred to the peripheral surface 121a and may be further transferred to the cooling medium. Particularly, the portion of the peripheral surface 121a that may be formed by the superhard table 150a may provide efficient convective heat transfer from the superhard bearing elements 120a to the cooling medium.

In addition, the superhard bearing elements 120a may protrude from the support ring structure 110a in a manner that increases exposure of the peripheral surface 121a and/or of the portion of the peripheral surface 121a formed by the superhard table 150a. In other words, the superhard bearing elements 120a may have an exposed protruding portion that extends above a top surface of the support ring structure 110a a distance 123a (measured from top surface of the bearing element 120a to the top surface of the support ring 140a), which is equal to or greater than the portion of the peripheral surface 121a that is formed by the superhard table 150a. Hence, in some embodiments, the superhard bearing elements 120a may protrude above the support ring structure 110a to the distance 123a that may be between about 0.090" and about 0.200"; between about 0.180" and about 0.300"; between about 0.250" and about 0.400"; between about 0.300" and about 0.500." In other embodiments, the superhard bearing elements 120a may protrude above the support ring structure 110a to a height of about 0.90 (or more) multiplied by the thickness of the superhard table 150a (e.g., a 0.100" thick polycrystalline diamond table multiplied by 0.90 equals 0.090"). In additional or alternative embodiments, the superhard bearing elements 120a may protrude above the support ring structure 110a to a height that is greater than 0.500". In other embodiments, the superhard bearing elements 120a may protrude above the support ring structure 110a to a height that is greater than 0.090".

As mentioned above, the superhard bearing elements 120a may have any number of suitable peripheral surfaces. For instance, such peripheral surfaces may maximize the ratio of the surface area of the peripheral surface to the volume of the superhard table. In the embodiment illustrated in FIG. 1B, a thrust-bearing assembly 100b may incorporate superhard bearing elements 120b that may have polygonal bearing surfaces 122b and corresponding peripheral surfaces 121b, circumscribing the polygonal bearing surfaces 122b. Except as otherwise described herein, the thrust-bearing assembly 100b and its materials, components, or elements (e.g., superhard tables) may be similar to or the same as the thrust-bearing assembly 100a (FIG. 1A). For example, the thrust-bearing assembly 100b may include a support ring structure 110b that may secure the superhard bearing elements 120b.

The peripheral surface 121b of the superhard bearing elements 120b may provide increased surface area to volume ratio as compared with an approximately cylindrical superhard bearing element. The peripheral surface 121b also may include a superhard table 150b bonded or secured to a substrate 160b. Furthermore, as described above, a portion of the peripheral surface 121b may be formed or defined by the superhard table 150b. Accordingly, increasing the surface area to volume ratio of the superhard bearing elements 120b also may decrease the volume of the superhard table 150b per unit area of the peripheral surface 121b that may be formed by the superhard table 150b. In other words, cubic superhard bearing elements 120b may use less polycrystalline diamond compact in the superhard table 150b to form the same surface area on the peripheral surface 121b as compared with a cylindrical superhard bearing elements (e.g., superhard bearing elements 120a (FIG. 1A)).

In one or more embodiments, at least a portion of the peripheral surface 121b may have rounded or filleted corners, such as to facilitate manufacturing of the thrust-bearing assembly 100b (e.g., rounded corners may allow recesses that may secure the superhard bearing elements 120b to be conventionally machined). In addition, rounded corners on the superhard bearing elements 120b may reduce chipping, cracking, or otherwise breaking of the superhard table 150b, which may result at or near substantially sharp corners. Likewise, providing rounded corners in the recesses that may secure the superhard bearing elements 120b may reduce or eliminate strain- or stress-induced cracks that may occur at sharp corners. However, an embodiment may include the superhard bearing elements 120b that have a square or rectangular cross-section with substantially sharp corners, without limitation. In such embodiment, the recesses in the support ring structure also may have sharp corner (such recesses may be manufactured using electro-discharge machining ("EDM"), wire EDM, water jet cutting, etc.).

In some embodiments, the substrate 160b and the superhard table 150b may have substantially the same cross-sectional size and shape. In other embodiments, the substrate 160b and the superhard table 150b may have different sizes and/or shapes from each other. For instance, the substrate 160b may have a circular cross-sectional shape, while the superhard table 150b may have a square or rectangular cross-sectional shape. In an embodiment, a bottom of the superhard table 150b may be located above the support ring structure 110b. Hence, for instance, a cylindrical substrate may be located inside a cylindrical recess, and a cubic superhard table 150b may be bonded to the cylindrical substrate and may protrude above the support ring structure 110b.

It should be appreciated that the superhard bearing elements also may have other shapes of the peripheral surfaces some of which may maximize the ratio of volume of superhard table to surface area of the peripheral surface. For instance, the peripheral surface of the superhard bearing elements 120b may have a cuboid or a rectangular cross-section. Additionally or alternatively, the superhard bearing elements 120b may have a triangular cross-section, which may further increase the surface area to volume ratio of the peripheral surface (as compared with a square or rectangular cross-sectional shape).

Figure 1B:
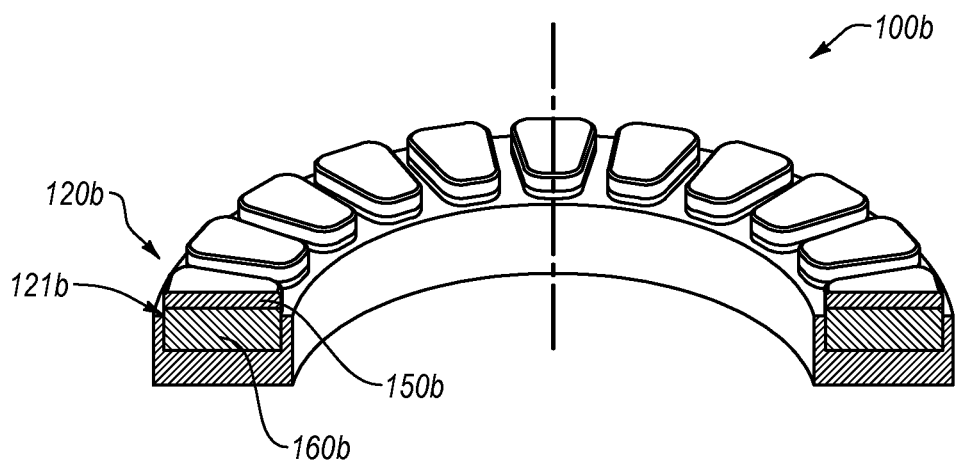
FIG. 1B is a cross-sectional view of a thrust-bearing assembly according to another embodiment.
Figure 1C:
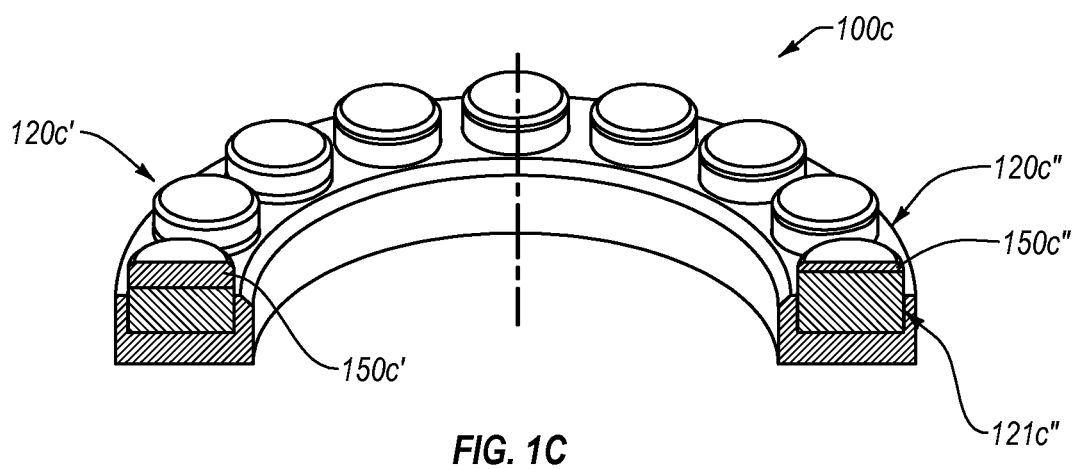
FIG. 1C is a cross-sectional view of a thrust-bearing assembly according to yet one other embodiment.

In an embodiment, all or substantially all of the superhard bearing elements may be the same or similar to each other (e.g., all of the superhard bearing elements may include a superhard table). In another embodiment, a thrust-bearing assembly may include superhard bearing elements that have superhard tables exhibiting selected thicknesses, respectively, as well as superhard bearing elements that have conventional or standard superhard tables. For example, FIG. 1C illustrates a thrust-bearing assembly 100c that incorporates superhard bearing elements 120c, such as superhard bearing elements 120c' and superhard bearing elements 120c", which may include superhard tables of different thicknesses and/or configuration. Except as otherwise described herein, the thrust-bearing assembly 100c and its materials, components, or elements (e.g., bearing elements) may be similar to or the same as any of the thrust-bearing assemblies 100a, 100b (FIGS. 1A and 1B).

In one or more embodiments, the superhard bearing elements 120c' may include a superhard table 150c', while the superhard bearing elements 120c" may include a superhard table 150c". For example, superhard table 150c' may have a thickness of between about 0.100" and about 0.140"; between about 0.120" and about 0.187"; between about 0.156" and about 0.250"; or between about 0.250" and about 0.312". Embodiments may include the superhard table 150c" having a thickness of less than 0.120", between about 0.020" and about 0.040"; between about 0.030" and about 0.060"; between about 0.050" and about 0.080"; or between about 0.070" and about 0.100". For instance, under some operating conditions, one or more of the superhard bearing elements 120c may experience higher forces and/or friction than other superhard bearing elements 120c. Particularly, the superhard bearing elements 120c' may be positioned in a manner that the superhard bearing elements 120c' experience higher forces and/or friction than the superhard bearing elements 120c". In an embodiment, the thrust-bearing assembly 100c may include a single or multiple superhard bearing elements 120c' located near or at one or more location that may experience the greatest amount of force and/or shear, as compared with the superhard bearing elements 120c".

Conversely, the superhard bearing elements 120c" may experience less force and/or shear than the superhard bearing elements 120c'. As such, thinner superhard tables 150c" of the superhard bearing elements 120c" may provide sufficient heat dissipation for the superhard bearing elements 120c". It is believed that reduced force and/or friction experienced by the superhard bearing elements 120c" may produce or generate less heat, which may need to be dissipated, to avoid heating the superhard table 150c" to or above detrimental temperatures. Accordingly, because the superhard bearing elements 120c" and/or the superhard tables 150c" may require lower heat dissipation, the superhard table 150" may be thinner than the superhard table 150c' of the superhard bearing elements 120c'.

The superhard bearing elements 120c" may include the superhard table 150c" that may have any number of suitable thicknesses, which may vary from one embodiment to another. For example, the thickness of the superhard table 150c" may depend on the material used therein, loads carried by the superhard bearing elements 120c", amount of cooling provided by the cooling medium, and the like. In one or more embodiments, the thickness of the superhard table 150c" may be less than 0.100". Specifically, the thickness of the superhard table 150c" may be between about 0.040" and about 0.060"; between about 0.050" and about 0.080"; or between about 0.070" and thrust-bearing assembly 100". It should be appreciated that, in some instances, the thickness of the superhard table 150c" may be less than 0.040". It should be appreciated that, in an embodiment, the superhard bearing elements 120c' and the superhard bearing elements 120c" may include bearing surfaces 122c that are substantially coplanar with each other.

Figure 1D:
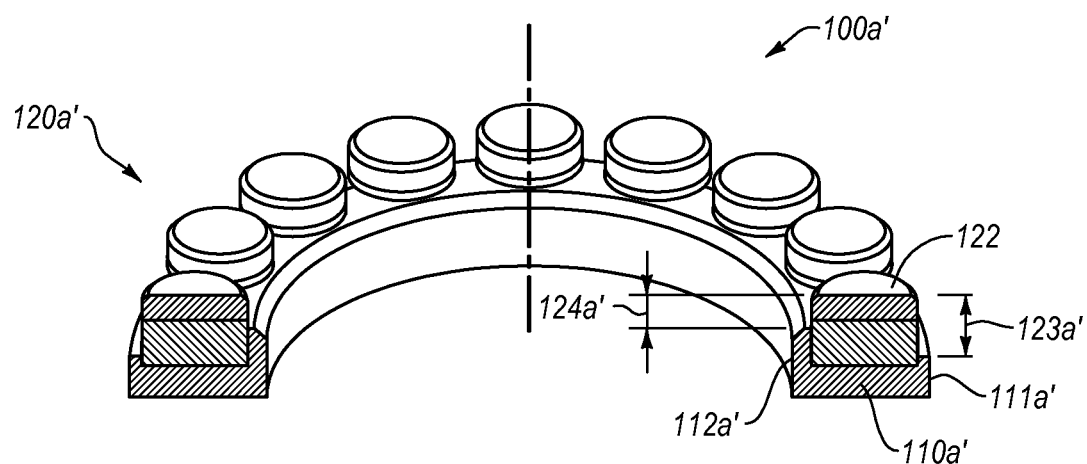
FIG. 1D is a cross-sectional view of an embodiment of a thrust-bearing assembly that has more exposure of superhard bearing elements on an outer side of a support ring structure than on an inner side thereof.
Figure 2A:
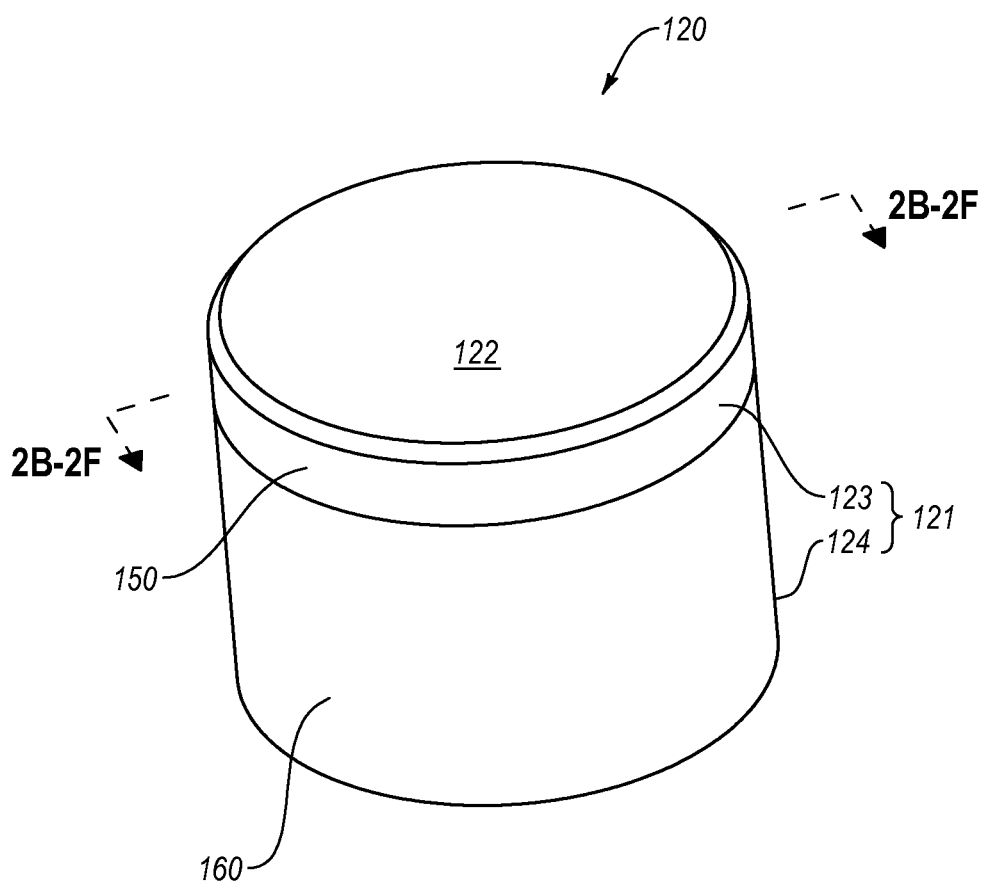
FIG. 2A is an isometric view of a bearing element according to an embodiment.

In an embodiment, the thrust-bearing assembly also may provide increased exposure to cooling fluid on one or more sides of the bearing elements. FIG. 1D illustrates an embodiment of a thrust-bearing assembly 100a' that has more exposure of superhard bearing elements 120d on an outer side of a support ring structure 110d than on an inner side thereof.

Except as otherwise described herein, the thrust-bearing assembly 100d and its materials, components, or elements (e.g., bearing elements) may be similar to or the same as any of the thrust-bearing assemblies 100a, 100b, 100c (FIGS. 1A, 1B, and 1C). For instance, the superhard bearing elements 120d of the thrust-bearing assembly 100d may be the same as any of the superhard bearing elements 120a, 120b, 120c', 120c" (FIGS. 1A, 1B, and 1C).

In one embodiment, the support ring structure 110a' of the thrust-bearing assembly 100a' includes an outer side 111a' and an inner side 112a'. Particularly, the outer side 111a' may define an outside diameter of the support ring structure 110a'. Similarly, the inner side 112a' may define the inside diameter of the support ring structure 110a'. Furthermore, as mentioned above, the outer side 111a' may have a first height that is smaller than a second height of the inner side 112a'. As such, the superhard bearing elements 120a' may have more exposure to fluid on the outer side 111a' than on the inner side 112a' (i.e., the superhard bearing elements 120a' may have a first distance 123a' from the top of the support ring structure 110a' on the outer side 111a' to the bearing surface 122 and a second distance 124a' from the top of the support ring structure 110a' on the inner side 112a' to the bearing surface 122). Also, increased height of the inner side 112a' of the support ring structure 110a' (relative to the height of the outer side 111a') may provide increased support to the superhard bearing elements 120a', which may allow the thrust-bearing assembly 100a' to carry a greater load, as compared with a thrust-bearing assembly with equal inner and outer heights.

In addition to various shapes and configurations of the peripheral surface, the superhard bearing elements also may include various configurations of the superhard table, which may vary from one embodiment to the next. FIGS. 2A-2F illustrate embodiments of the superhard bearing elements that include various superhard tables. Generally, except otherwise described herein, any of the superhard bearing elements illustrated in FIGS. 2B-2F may have a peripheral surface that has the same or similar shape and/or size as a peripheral surface 121 of the superhard bearing element 120, illustrated in FIG. 2A. Moreover, any of the thrust-bearing assemblies 100a, 100b, 100c (FIGS. 1A-1C) may include any of the superhard bearing elements illustrated in FIGS. 2A-2F as well as combinations thereof.

In some embodiments, the superhard bearing element 120 may include a superhard table 150 bonded to a substrate 160. The superhard table 150 may include the bearing surface 122 of the superhard bearing element 120. Together, the superhard table 150 and the substrate 160 may form or define the peripheral surface 121.

More specifically, in one embodiment, the peripheral surface 121 may comprise a superhard portion 123 that may be formed by the superhard table 150 and a substrate portion 124, which may be formed by the substrate 160. As noted above, an embodiment includes the superhard and substrate portions 123, 124 of the peripheral surface 121 that have similar or the same outer sizes and shapes. In other words, the peripheral surface 121 may have no gaps, breaks, or significant imperfections between the superhard and substrate portions 123, 124 thereof. In alternative or additional embodiments, the superhard and substrate portions 123, 124 may have different sizes and/or shapes. For instance, the superhard portion 123 may have a cubic prismoid or cuboid shape, while the substrate portion 124 may have a cylindrical shape.

Also, the surface area of the bearing surface 122 may have a predetermined ratio to the surface area of the superhard portion 123 of the peripheral surface 121. In an embodiment, the superhard portion 123 may have an approximately cylindrical shape, which may define an approximately circular perimeter of the bearing surface 122. Hence, in an embodiment, the ratio of the bearing surface 122 to the superhard portion 123 of the peripheral surface 121 may be approximately 4:1 or more. In another embodiment, the ratio of the bearing surface 122 to the superhard portion 123 may be approximately 2:1 or more. It should be appreciated that the ratio of the bearing surface 122 to the superhard portion 123 may be greater than 4:1 or less than 2:1.

In some embodiments, the bearing surface 122 may be substantially planar or flat, which may facilitate use of the superhard bearing elements 120 in a thrust-bearing assembly and apparatus. In additional or alternative embodiments, the superhard bearing elements 120 may have a curved bearing surface 122. For instance, in an embodiment, the bearing surface 122 may have a convex curvature. Similarly, in another embodiment, the bearing surface 122 may have a concave curvature. As described below in further detail, the superhard bearing elements 120 having convexly and/or concavely curved bearing surface 122 may be included in radial-bearing assemblies and apparatuses.

As illustrated in FIG. 2B, in some embodiments, a superhard bearing elements 120c may have a substantially flat interface 125c between a superhard table 150c and a substrate 160c. In other words, the superhard table 150c may have a substantially uniform profile that may have approximately the same thickness throughout (e.g., the thickness of the superhard table 150c may vary across the substrate 160c after grinding and/or lapping of the bearing surface of the superhard bearing elements 120c). As noted above, the superhard bearing elements 120c may include a peripheral surface 121c that has a superhard portion 123c defined or formed by the superhard table 150c and a substrate portion 124c, which may be defined or formed by the substrate 160c. In an embodiment, the thickness of the superhard table 150c may be approximately the same as the height of the superhard portion 123c of the peripheral surface 121c.

As illustrated in FIG. 2C, an embodiment also may include a superhard bearing element 120d that may have a curved interface 125d between an superhard table 150d and a substrate 160d. Particularly, the curved interface 125d may have a curvilinear surface, which may vary along two or three dimensions. For example, the curved interface 125d may approximate a convex hemispherical or a partially convex spherical surface, such that the distance from a bearing surface 122d to the curved interface 125d increases with the distance from a center of the superhard bearing element 120d to a peripheral surface 121d thereof.

Alternatively, the curved interface 125d may have an approximately partially concave cylindrical surface, such that the distance from a center of the superhard bearing element 120d to the peripheral surface 121d decreases along a first dimension, while remaining approximately constant along a second dimension. It should be appreciated, however, that the curved interface 125d may have any number of shapes, configurations, orientations, and the like. Hence, embodiments may include curved interface 125d that may have other curvilinear shapes and/or sizes (e.g., elliptical surface, irregular curved surfaces, etc.).

In an embodiment, the peripheral surface 121d may include a superhard portion 123d defined or formed by the superhard table 150d and a substrate portion 124d, which is defined or formed by the substrate 160d. In an embodiment, the superhard portion 123d of the peripheral surface 121d may have a height that is greater than the average thickness of the superhard table 150d. As such, the superhard bearing element 120d may have an increased ratio of surface area of the superhard portion 123d of the peripheral surface 121d to the volume of the superhard table 150d, as compared with the superhard bearing element 120c that has the flat interface 125c (FIG. 2B). Thus, the superhard bearing element 120d (e.g., as compared with superhard bearing element 120c) may be more cost effective to manufacture and may exhibit the same or similar efficiency in dissipating heat from the superhard table 150d and/or superhard bearing element 120d as the superhard bearing element 120c (FIG. 2B).

In an alternative embodiment, as illustrated in FIG. 2D, a superhard bearing element 120e may include a substantially conical interface 125e between the superhard table 150e and substrate 160e. In an embodiment, the conical interface 125e may form a peak at an uppermost point thereof. Specifically, the peak of the conical interface 125e may be the closest portion thereof to a bearing surface 122e of the superhard bearing element 120e. In some instances, the peak may be approximately aligned with a central axis of the superhard bearing element 120e. In other embodiments, the peak may be located off center from the central axis. Moreover, in at least one embodiment, the peak may include a radius or a chamfer (or a flat area) that may reduce stress, which may otherwise occur at a substantially sharp point of the peak.

Further embodiments may include superhard bearing elements that have any other selected interface between the superhard table and the substrate. For instance, FIG. 2E illustrates a superhard bearing element 120f that may include a stepped interface 125f between a superhard table 150f and a substrate 160f. As mentioned above, the superhard bearing element 120f may be substantially cylindrical. In an embodiment, one or more planes of the stepped interface 125f may be approximately circular. For example, the stepped interface 125f may include a first surface 126f and a second surface 127f each of which has a substantially circular-shaped outer perimeter. Furthermore, the first and second surfaces 126f, 127f may be located at different heights relative to a bearing surface 122f of the superhard bearing element 120f. In other words, the superhard table 150f may have a different thickness along the first surface 126f than along the second surface 127f. In an embodiment, the superhard table 150f may be thicker along the second surface 127f than along the first surface 126f. Optionally, first and second surfaces 126f and/or 127f may be textured, grooved, dimpled, combinations thereof, or otherwise non-planar.

As described above, the superhard bearing element 120f may have a peripheral surface 121f that may include a superhard portion 123f (e.g., an annular portion) formed or defined by the superhard table 150f and a substrate portion 124f, which may be formed or defined by the substrate 160f. In some embodiments, the superhard portion 123f may have a height (i.e., a distance from the substrate portion 124f to a bearing surface 122f of the superhard bearing element 120f) that is greater than the average thickness of the superhard table 150f. For instance, the thickness of the superhard table 150f along the first surface 126f may be less than the thickness of superhard table 150f along the second surface 127f, which may form or define the superhard portion 123f of the peripheral surface 121f.

Embodiments also may include superhard bearing elements that include a stepped interface that has one or more transition regions between the major surfaces thereof. FIG. 2F illustrates a superhard bearing element 120g that has a stepped interface 125g between an superhard table 150g and a substrate 160g. Specifically, the stepped interface 125g of the superhard bearing element 120g may include a first surface 126g, a second surface 127g, and a transition region 128g that may extend between the first and second surfaces 126g, 127g. The first and/or second surfaces 126g, 127g may be substantially the same as the first and/or second surfaces 126f, 127f (FIG. 2E). In some instances, the surface of the transition region 128g may have a non-orthogonal orientation relative to the first and/or second surfaces 126g, 127g. As such, in addition to the first and second surfaces 126g, 127g, the transition region 128g may carry at least a portion of the load supported by the superhard bearing element 120g.

Furthermore, the thickness of the superhard table 150g, as measured from the first surface 126g, may be substantially less than the thickness of the superhard table 150g on the second surface 127g. In other words, the superhard table 150g may have a first distance from the first surface 126g to a bearing surface 122g and a second distance from the second surface 127g to the bearing surface 122g, where the first distance is substantially smaller than the second distance. For example, the first distance may be between about 0.040" to about 0.080"; between about 0.060" to about 0.120"; or between about 0.100" to about 0.150". The second distance may be between about 0.120" to about 0.180"; between about 0.150" to about 0.250"; between about 0.200" to about 0.300", and, in some instances, may be greater than 0.003", greater than 0.400", or greater than 0.500", such as between about 0.300" to about 0.400," between about 0.400" to about 0.500," or between about 0.500" to about 0.600". It should be appreciated that in some embodiments, the first distance may be less than 0.040" or greater than 0.150". Likewise, the second distance may be less than about 0.040" and greater than 0.600".

As described above, the superhard bearing element 120g may have a peripheral surface 121g that may include a superhard portion 123g formed or defined by the superhard table 150g and a second portion, which may be formed or defined by the substrate 160g. Including the stepped interface 125g between the superhard table 150g and the substrate 160g may provide a higher ratio of the height of the superhard table 150g that may be exposed to the cooling medium (i.e., the height of the superhard portion 123g of the peripheral surface 121g) to the average thickness of the superhard table 150g. In any event, the superhard portion 123g of the peripheral surface 121 may facilitate sufficient convective heat transfer from the superhard bearing element 120g to the cooling medium.

Figure 3:
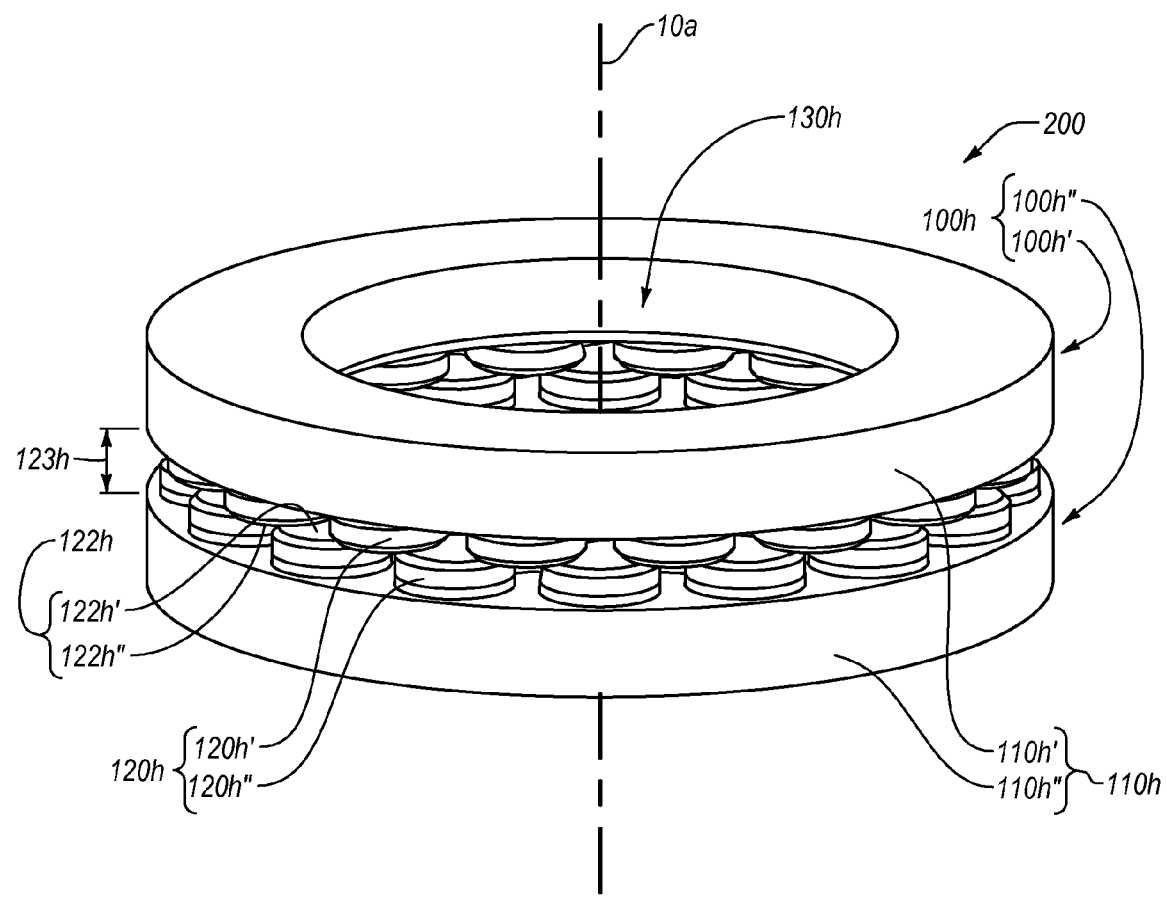
FIG. 3 is an isometric view of a thrust-bearing apparatus according to an embodiment, which may employ one or more of the thrust-bearing assembly embodiments disclosed herein.

As noted above, any of the superhard bearing elements described herein may be included in any thrust-bearing assembly. Furthermore, any of the thrust-bearing assemblies described herein may be incorporated in a thrust-bearing apparatus. FIG. 3 illustrates an embodiment of a thrust-bearing apparatus 200, which may incorporate any of the thrust-bearing assemblies 100a, 100b, 100c (FIGS. 1A-1C) as a stator and/or a rotor. Specifically, the thrust-bearing apparatus 200 may include first and second thrust-bearing assemblies thrust-bearing assemblies 100h', 100h". The first thrust-bearing assembly 100h' may be the stator that remains stationary, while the second thrust-bearing assembly 100h" may be the rotor that may rotate relative to the stator, or vice versa.

Each of the first thrust-bearing assembly 100h' and the second thrust-bearing assembly 100h" may include multiple generally opposing superhard bearing elements 120h (e.g., superhard bearing elements 120h', 120h") that face and engage one another, which may be mounted in or on support ring structures 110h (i.e., respective support ring structures 110h', 110h"). Additionally, the superhard bearing elements 120h', 120h" may have bearing surfaces 122h, such as bearing surfaces 122h', 122h", respectively. In particular, the bearing surfaces 122h' may generally oppose and engage the bearing surfaces 122h". As such, the superhard bearing elements 120h may prevent relative axial movement of the first thrust-bearing assembly 100$h'$ and the second thrust-bearing assembly 100$h'''$ (along the thrust axis 10$a$), while allowing the second thrust-bearing assembly 100$h''$ to rotate relative to the first thrust-bearing assembly 100$h'$ about the thrust axis 10$a$.

Moreover, the first thrust-bearing assembly 100$h'$ and/or the second thrust-bearing assembly 100$h''$ may include openings 130$h$. A shaft, such as an output shaft of the subterranean drilling system, may fit through and/or may be secured within one of the openings 130$h$. For example, the shaft may fit through the opening 130$h$ of the first thrust-bearing assembly 100$h'$ in a manner that the shaft may freely rotate within the opening 130$h$ of the first thrust-bearing assembly 100$h'$ and may be secured to the second thrust-bearing assembly 100$h''$.

Although the thrust-bearing apparatus 200 described above may incorporate multiple superhard bearing elements 120$h$ that have corresponding bearing surfaces 122$h$, it should be appreciated that this is one of many embodiments. For example, one of the first thrust-bearing assembly 100$h'$ or the second thrust-bearing assembly 100$h''$ may include a single superhard bearing element that spans substantially an entire circumference thereof. In other words, the superhard bearing element may form a single or substantially uninterrupted bearing surface that may span the entire circumference of the first and/or second thrust-bearing assemblies 100$h'$, 100$h''$. Furthermore, the first thrust-bearing assembly 100$h'$ and/or the second thrust-bearing assembly 100$h''$ may have any number of the superhard bearing elements 120$h$ that may be spaced apart from each other in any desired configuration, which may vary from one embodiment to another. For instance, in some embodiments, the superhard bearing elements 120$h$ may overlap about or be spaced closely together, thereby forming a substantially continuous bearing surface 122$h$.

In additional or alternative embodiments, the thrust-bearing apparatus may include only a single thrust-bearing bearing assembly (e.g., the first or second thrust-bearing assembly 100$h'$, 100$h''$). For example, the bearing surfaces 122$h$ of the first thrust-bearing assembly 100$h'$ may engage a component or element of a machine, which may be stationary or may be moveable relative to the first thrust-bearing assembly 100$h'$. In an embodiment, the bearing surfaces 122$h'$ of the first thrust-bearing assembly 100$h'$ may engage a substantially flat plate that may be secured to a rotating element or component of a machine or mechanism that incorporates the first thrust-bearing assembly 100$h'$.

In one or more embodiments, the thrust-bearing apparatus 200 may include a space between the support ring structures 110$h'$, support ring structure 110$h''$ (e.g., the space formed by the protruding superhard bearing elements 120$h$). Such space may accommodate entry and/or pass-through of the cooling medium (e.g., drilling mud), which may transfer or remove heat from the thrust-bearing apparatus 200 as well as components or elements thereof (e.g., from the support ring structure 110$h$ and from the superhard bearing elements 120$h$). Increasing the space between the support ring structures 110$h'$, 110$h''$ may increase and/or may allow an increased flow or pass-through of the cooling medium through the thrust-bearing apparatus 200. As noted above, the first and/or second thrust-bearing assemblies 100$h'$, 100$h''$ may include superhard bearing elements 120$h$ that may protrude to a greater degree, as compared with standard bearing elements. Consequently, such superhard bearing elements 120$h$, as provided by this disclosure, may create a selected gap 123$h$ between the support ring structures 110$h'$, 110$h''$ and may increase the flow of cooling medium through the thrust-bearing apparatus 200. Increased flow of the cooling medium, in turn, may lead to increased heat transfer from the thrust-bearing apparatus 200 (as compared with a thrust-bearing apparatus having a conventional gap between the support ring structures).

Particular size or dimension of the gap 123$h$ between the support ring structures 110$h'$, 110$h''$ may vary from one embodiment to the next. Among other things, the dimension of the gap 123$h$ may depend on the forces and/or friction experienced by the superhard bearing elements 120$h$, type of the cooling medium that circulates through the thrust-bearing apparatus 200, etc. Furthermore, the gap 123$h$ may not be uniform throughout the thrust-bearing apparatus 200. In other words, at some locations, dimension of height of the gap 123$h$ may be greater than the dimension at other locations thereof. In any event, in some embodiments, the gap 123$h$ may include at least one dimension that is in one or more of the following ranges: between about 0.200" and about 0.400"; between about 0.300" and about 0.600"; between about 0.200" and about 1.00", or between about 0.500" and 1.00". It should be appreciated, however, that the gap 123$h$ also may have at least one dimension (e.g., a height) that is greater than 1.00".

Tests were performed with various thrust-bearing apparatuses to quantify the advantages provided by the thrust-bearing apparatus 200 and variants thereof. Specifically, tested thrust-bearing apparatuses were subjected to a constant speed (i.e., the rotor was rotated at a constant speed, while the stator was held stationary) and to an increasing load, which was increased at a target rate of 3 lbf/sec until failure of the tested thrust-bearing apparatus. To identify failure of the tested thrust-bearing apparatus, torque was monitored: prior to failure, the torque increased generally linearly with corresponding increase of the load; after the failure, torque exhibited nonlinear increase with increased load. After the failure was detected, experiment was stopped and applied force was recorded. In addition, failure of the tested thrust-bearing apparatuses and/or superhard bearing elements was confirmed visually, by inspecting the failed thrust-bearing apparatuses.

Furthermore, the tested thrust-bearing apparatuses included 17-4 stainless steel support rings to which the superhard bearing elements were mounted, which were approximately 0.640" in diameter. In one experiment, a first configuration of a thrust-bearing apparatus included the superhard bearing elements that protruded about 0.065" above the support ring and included superhard bearing table having about 0.050" thickness, which included a standard polycrystalline diamond (i.e., a standard polycrystalline diamond compact including a polycrystalline diamond table formed from about 40 μm diamond particle size feedstock bonded to a cobalt-cemented tungsten carbide substrate). The polycrystalline diamond compacts were HPHT processed at a cell pressure of about 5 GPa to sinter the diamond particle feedstock to form the polycrystalline diamond table. The thrust-bearing apparatuses having the first configuration were tested twice: (i) during the first test, the first configuration of the thrust-bearing apparatus exhibited failure at about 15,500 lbf; (ii) during the second test, the first configuration of the thrust-bearing apparatus exhibited failure at about 19,000 lbf.

A second configuration of the thrust-bearing apparatus included the superhard bearing elements that had superhard bearing table having 0.065" thickness, which included a polycrystalline diamond (i.e., polycrystalline diamond compact including a polycrystalline diamond table formed from about 19 μm diamond particle size feedstock bonded to a cobalt-cemented tungsten carbide substrate). The polycrystalline diamond compacts were HPHT processed at a relatively more extreme cell pressure to sinter the diamond particle feedstock to form the polycrystalline diamond table compared to the superhard bearing elements of the first configuration. The thrust-bearing apparatuses having the second configuration were tested twice: (i) during the first test, the second configuration of the thrust-bearing apparatus exhibited failure at about 19,000 lbf; (ii) during the second test, the second configuration of the thrust-bearing apparatus exhibited failure at about 19,500 lbf.

In addition, one embodiment of the thrust-bearing apparatus 200 (FIG. 3) was tested. More specifically, the thrust-bearing apparatus 200 included superhard bearing elements 120$h$ that had superhard table having 0.100" thickness, which was formed of polycrystalline diamond bonded to a cobalt-cemented tungsten carbide substrate. In an embodiment, the superhard bearing elements 120$h$ may protrude about 0.120" above the support ring. Additionally, the thrust-bearing apparatuses 200 with superhard bearing elements were subjected to substantially the same test as the thrust-bearing apparatuses of the first and second configurations, described above. The thrust-bearing apparatuses 200 also were tested twice: (i) during the first test, the thrust-bearing apparatus 200 exhibited failure at about 33,000 lbf; (ii) during the second test, the thrust-bearing apparatus 200 exhibited failure at about 34,000 lbf.

As clearly apparent, the thrust-bearing apparatuses 200 provided a superior load-carrying capability as compared with the other thrust-bearing apparatuses. It is believed that superior heat transfer capability of the superhard bearing elements 120$h$ of the thrust-bearing apparatus 200 facilitates sufficient heat transfer from the superhard bearing elements 120$h$ to prevent the temperature of the superhard tables thereof from reaching detrimental or damaging levels. In other words, the superhard bearing elements 120$h$ used in the experiments were believed to have maintained a temperature of the superhard tables below about 700° C., at least until the load was increased to about over 33,000 lbf.

Although the above embodiments were described in connection with the thrust-bearing apparatuses and assemblies, it should be appreciated that other embodiments are directed to radial-bearing apparatuses and assemblies. For instance, FIGS. 4A-4D illustrate embodiments of radial-bearing assemblies that may comprise radial-bearing apparatuses. Except as described herein, the radial-bearing assemblies illustrated in FIGS. 4A-4D and described below, as well as their respective materials, elements, or components, may be similar to or the same as any of thrust-bearing assemblies 100$a$, 100$b$, 100$c$, 100$h$ (FIGS. 1A-3) and their respective materials, elements, or components (FIGS. 1A-3). For example, any of the bearing elements included in the radial-bearing assemblies of FIGS. 4A-4D may be similar to or the same as any of the superhard bearing elements 120-120$h$ (FIGS. 1A-3).

Figure 4A:
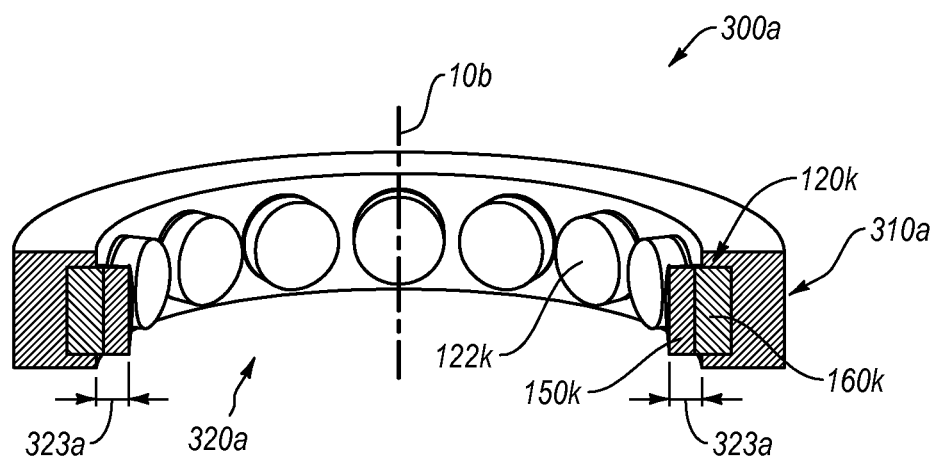
FIG. 4A is a cross-sectional view of a first radial-bearing assembly according to an embodiment.

Specifically, FIG. 4A illustrates a first radial-bearing assembly 300$a$ that may include superhard bearing elements 120$k$ that may have an superhard table 150$k$ and a substrate 160$k$. In particular, the superhard bearing elements 120$k$ may be secured to a support ring structure 310$a$. The superhard bearing elements 120$k$ also may be positioned about a rotation axis 10$b$. For example, the superhard bearing elements 120$k$ may be positioned circumferentially about the rotation axis 10$b$.

In an embodiment, the superhard bearing elements 120$k$ may define an opening 320$a$, which may accommodate a second radial-bearing assembly that may include bearing elements that may engage the superhard bearing elements 120$k$. In particular, the bearing elements of the second radial-bearing assembly may engage the superhard bearing elements 120$k$ in a manner that permits relative radial rotation of the first radial-bearing assembly 300$a$ and the second radial bearing assembly but limits relative lateral movement thereof, as described below.

Accordingly, at least one, some of, or each superhard bearing element 330$a$ may include a superhard table (further described below) that has a concave bearing surface 122$k$ (e.g., curved to form an interior surface of an imaginary tubular cylinder). Similarly, at least one, some of, or each superhard bearing element of the second radial-bearing assembly (described below) may include a superhard table that has a convex bearing surface (e.g., curved to form at least a portion of an exterior surface of an imaginary cylinder or sphere). In any event, the concave bearing surface 122$k$ and the convex bearing surface may be shaped, sized, positioned, and oriented to generally correspond with and engage one another during operation of the radial-bearing apparatus.

Also, the support ring structure 310$a$ may define an outer perimeter (e.g., an outer diameter) of the first radial-bearing assembly 300$a$. Furthermore, the support ring structure 310$a$ may include support surfaces or areas that may couple or may be secured to a stationary portion of a device or mechanism. For instance, the support ring structure 310$a$ of the first radial-bearing assembly 300$a$ may be fixedly secured to a housing of the subterranean drilling system. Accordingly, as further described below, a radial-bearing apparatus that includes the first radial-bearing assembly 300$a$ may facilitate rotation of an output shaft relative to a housing about the rotation axis 10$b$.

As described above, at least one, some of, or each superhard bearing elements 120$k$ may have superhard table 150$k$ of the same or similar size (e.g., thickness and/or area of the superhard table 150$k$) and/or configuration (e.g., interface between the superhard table 150$k$ and the substrate 160$k$). Furthermore, the superhard bearing elements 120$k$ may protrude inward (i.e., toward the rotation axis 10$b$) and away from the support ring structure 310$a$ to a distance 323$a$, which may be sufficient to expose the entire superhard table 150$k$ to cooling fluid.

Figure 4B:
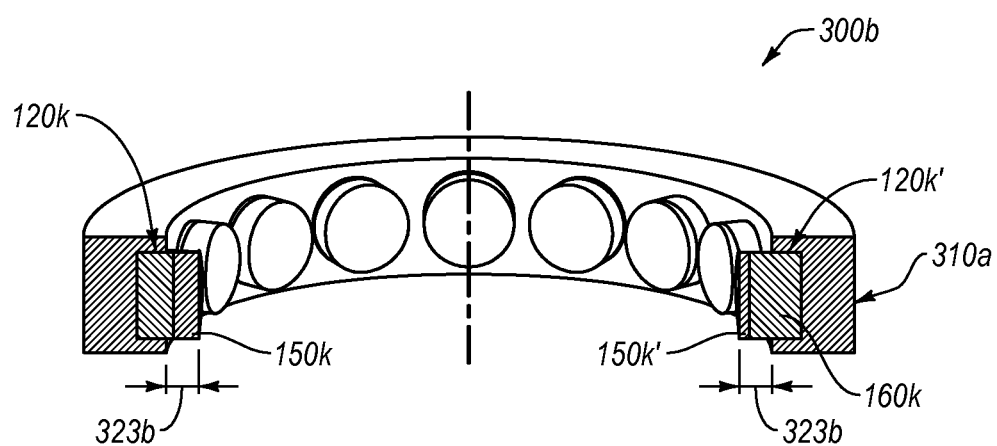
FIG. 4B is a cross-sectional view of a first radial-bearing assembly according to another embodiment.

Additionally or alternatively, at least one, some of, or each superhard bearing element 120$k$ may have differently sized superhard table. FIG. 4B illustrates a first radial-bearing assembly 300$b$ that includes superhard bearing elements 120$k$ that may have an superhard table 150$k$ as well as superhard bearing elements 120$k'$ that may include standard superhard table 150$k'$. Similar to the first radial-bearing assembly 300$a$ (FIG. 4A), the superhard bearing elements 120$k$, 120$k'$ of the first radial-bearing assembly 300$b$ may protrude toward the center of the support ring structure 310$a$ thereof to a distance of 323$b$, which may be sufficient to expose entire superhard tables 150$k$, 150$k'$ of some or all of the superhard bearing elements 120$k$, 120$k'$. In an embodiment, the superhard bearing elements 120$k$ may be located at or near a portion of the first radial-bearing assembly 300$b$ that may experience higher forces or friction than other portion(s) of the first radial-bearing assembly 300$b$. In other words, the superhard bearing elements 120$k$ may experience and/or carry higher forces than the superhard bearing elements 120$k'$.

For example, the rotation axis 10$b$ may be oriented at a non-parallel angle relative to the vector of the gravitational pull of the Earth. Accordingly, weight of the machine elements or unbalanced weight distribution of components coupled to or supported by the first radial-bearing assembly 300$b$ and/or by the second radial-bearing assembly may apply uneven forces to superhard bearing elements 120$k$ as compared with superhard bearing elements 120$k'$. For instance, a shaft connected to the second radial-bearing assembly and the housing securing the first radial-bearing assembly 300b may be oriented approximately horizontally or perpendicularly to the direction of Earth's gravitational pull. As such, the superhard bearing elements 120k may be positioned along a lower portion of the radial-bearing assembly 300b (i.e., below a horizontal centerline of the radial-bearing assembly 300b) may experience higher forces and/or friction than the superhard bearing elements 120k' that may be positioned along an upper portion of the radial-bearing assembly 300b.

Consequently, as mentioned above, one or more superhard bearing elements 120k also may experience higher thermal loads thereon than the superhard bearing elements 120k'. Thus, in at least one embodiment, the superhard table 150k with a selected thickness and/or exposure distance may facilitate increased heat transfer from the superhard bearing elements 120k to a cooling medium. For example, the superhard bearing elements 120k may limit operational temperatures to limit or prevent damage or degradation of the superhard bearing elements 120k and/or superhard table 150k.

Figure 4C:
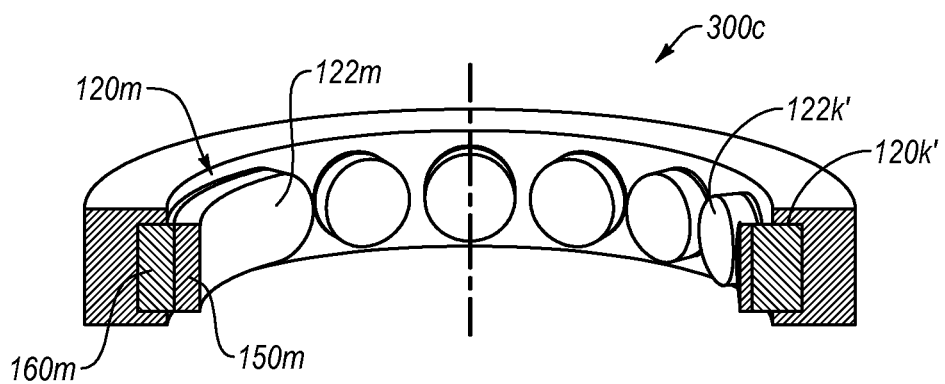
FIG. 4C is a cross-sectional view of a first radial-bearing assembly according to yet another embodiment.

In additional or alternative embodiments, as illustrated in FIG. 4C, a radial-bearing assembly 300c may include superhard bearing elements 120m, which may have an superhard table 150m bonded to or mounted on a substrate 160m. Particularly, the superhard bearing elements 120m may be located at or near the portion of the first radial-bearing assembly 300c that may experience or may be predicted to experience higher forces. In an embodiment, the first radial-bearing assembly also may include superhard bearing elements 120k'. For instance, the superhard bearing elements 120m may include a bearing surface 122m that may be substantially larger (i.e., in surface area) than a bearing surface 122k' of the superhard bearing elements 120k' (e.g., the bearing surface 122m may have a surface area ratio of 2:1, 3:1, etc. to the bearing surface 122k'). In some embodiments, the bearing surface 122m may be formed from multiple superhard bearing elements 120m positioned near or in contact with each other. Alternatively, the bearing surface 122m may be on a single superhard bearing element 120m. In any event, the superhard bearing element(s) 120m may have a substantially larger bearing surface as compared with the superhard bearing elements 120k'.

Figure 4D:
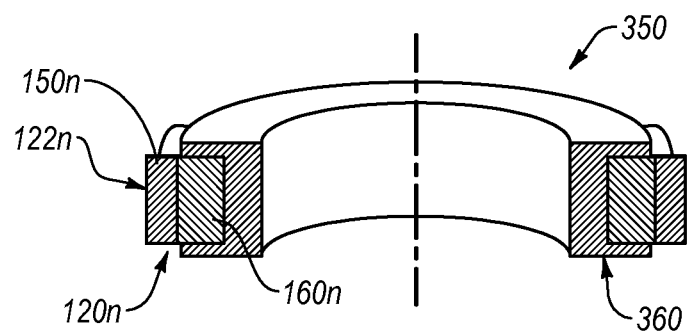
FIG. 4D is a cross-sectional view of a second radial-bearing assembly according to an embodiment.

As noted above, the radial-bearing apparatus may include a second radial-bearing assembly that may be located inside the first radial-bearing assembly. FIG. 4D illustrates one embodiment of a second radial-bearing assembly 350 that may include superhard bearing elements 120m secured to or within a support ring structure 360. Except as otherwise described herein, the second radial-bearing assembly 350 and its materials, elements, or components may be similar to or the same as any of the first radial-bearing assemblies 300a, 300b, 300c (FIGS. 4A-4C) and their respective material, elements, or components. In an embodiment, the superhard bearing elements 120m may be positioned and oriented on the support ring structure 360 in a manner that the superhard bearing elements 120m may engage corresponding bearing elements of any of the first radial-bearing assemblies 300a, 300b, 300c (FIGS. 4A-4C), as described above. In other words, the superhard bearing elements 120m may include a superhard table 150n having a selected thickness and a convex bearing surface 122n, which may correspond to concave bearing surface(s) of the first radial-bearing assembly.

In an embodiment, all of the bearing elements of the second radial-bearing assembly 350 may be superhard bearing elements 120n, which may include a superhard table 150n with a selected thickness bonded to or mounted on a substrate 160n. In additional or alternative embodiments, similar to the first radial-bearing assemblies, the second radial-bearing assembly 350 may include one or more bearing elements that may have a superhard table with a conventional thickness. Furthermore, in an embodiment, the second radial-bearing assembly 350 may include superhard bearing elements 120n that are positioned near or in contact with each other, and which may form a bearing surface that is substantially larger than bearing surfaces of other bearing elements of the second radial-bearing assembly. Such configurations may accommodate loads that may be unevenly distributed about the second radial-bearing assembly 350.

Similar to the first radial-bearing assemblies, the second radial-bearing assembly 350 may include superhard bearing elements 120n arranged in any number of suitable configurations, orientations, and positions. For instance, the superhard bearing elements 120n may be arranged in a single row, in two rows, three rows, four rows, or any other number of rows. In any event, as mentioned above, the superhard bearing elements 120n may be arranged in a manner that allows the superhard bearing elements 120n to contact and/or slide against the bearing elements of the first radial-bearing assembly.

Figure 5:
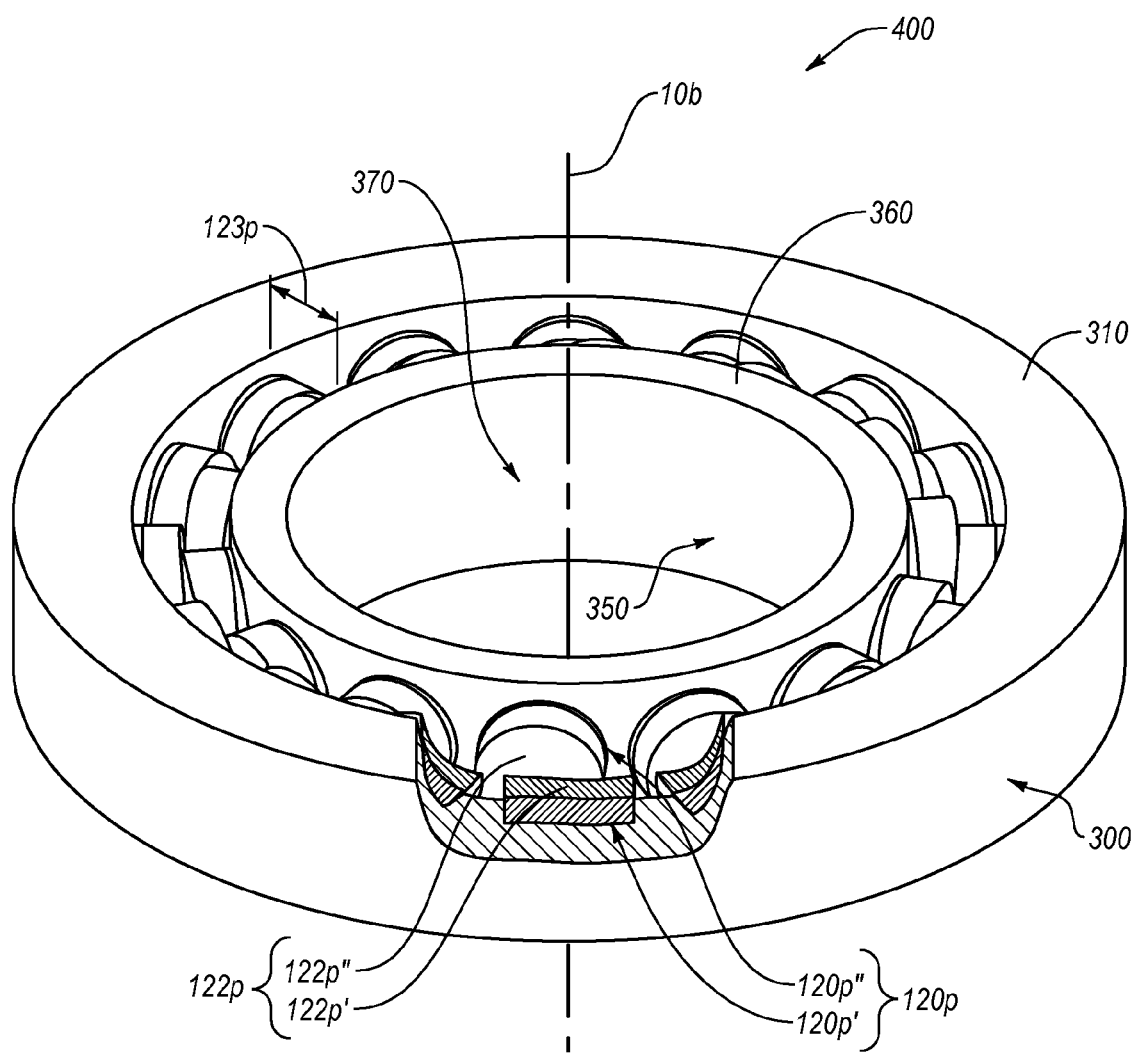
FIG. 5 is an isometric view of a radial-bearing apparatus according to an embodiment, which may employ any of the radial bearing assembly embodiments disclosed herein.

Accordingly, in an embodiment, the first and second radial-bearing assemblies may be engaged together to form a radial-bearing apparatus. FIG. 5 illustrates an embodiment of a radial-bearing apparatus 400. The concepts used in the thrust-bearing apparatuses described above also may be employed in radial-bearing apparatuses. Furthermore, except as otherwise described herein, the radial-bearing apparatus 400 and its materials, components, or elements may be similar to or the same as any of the thrust-bearing assemblies or apparatus 100a, 100b, 100c, 200 (FIGS. 1-3) and their respective materials, components, or elements. In addition, the radial-bearing apparatus 400 may incorporate any of the first radial-bearing assemblies 300a, 300b, 300c and the second radial-bearing assembly 350 (FIGS. 4A-4D).

Particularly, in an embodiment, the radial-bearing apparatus 400 may include first and second radial-bearing assemblies 300, 350, which may include corresponding superhard bearing elements 120p', superhard bearing elements 120p", any of which may be similar to or the same as any of superhard bearing elements 120-120n (FIGS. 1A-4D). Likewise, the superhard bearing elements 120p', superhard bearing elements 120p" may have corresponding bearing surfaces 122p (i.e., bearing surfaces 122p', bearing surface 122p") that may contact one another in a manner that allow the first and second radial-bearing assemblies 300, 350 to rotate relative to each other, while limiting or preventing lateral movement thereof. It should be appreciated that the first second radial-bearing assembly 300 may be a stator, while the and second radial-bearing assembly 350 may be a rotor or vice versa.

In an embodiment, a shaft (e.g., a drill shaft) or other machine component or element may pass into or through an opening 370 of the radial-bearing apparatus 400 and may be secured to the second radial-bearing assembly 350. Accordingly, the drill shaft may be rotated together with the second radial-bearing assembly 350, while the first radial-bearing assembly 300 remains stationary. For instance, the first radial-bearing assembly 300 may be coupled to a housing and may remain stationary relative thereto as well as relative to the shaft.

As described above, selecting a protrusion distance for superhard bearing elements, such as the superhard bearing elements 120p, may provide a selected gap 123p between a support ring structure 310 of the first radial-bearing assembly 300 and a support ring structure 360 of the second radial-bearing assembly 350. As such, the selected gap 123p may allow an increased flow or amount of cooling medium to pass through the radial-bearing apparatus 400, as compared with a conventional radial-bearing apparatus. Accordingly, as compared with a conventional radial-bearing apparatus, in addition to or in lieu of increased heat transfer that may be provided by the superhard bearing elements 120p (including by the relatively thick superhard tables thereof), the radial-bearing apparatus 400 may have increased heat transfer due to an increased flow of cooling medium therethrough.

Figure 6:
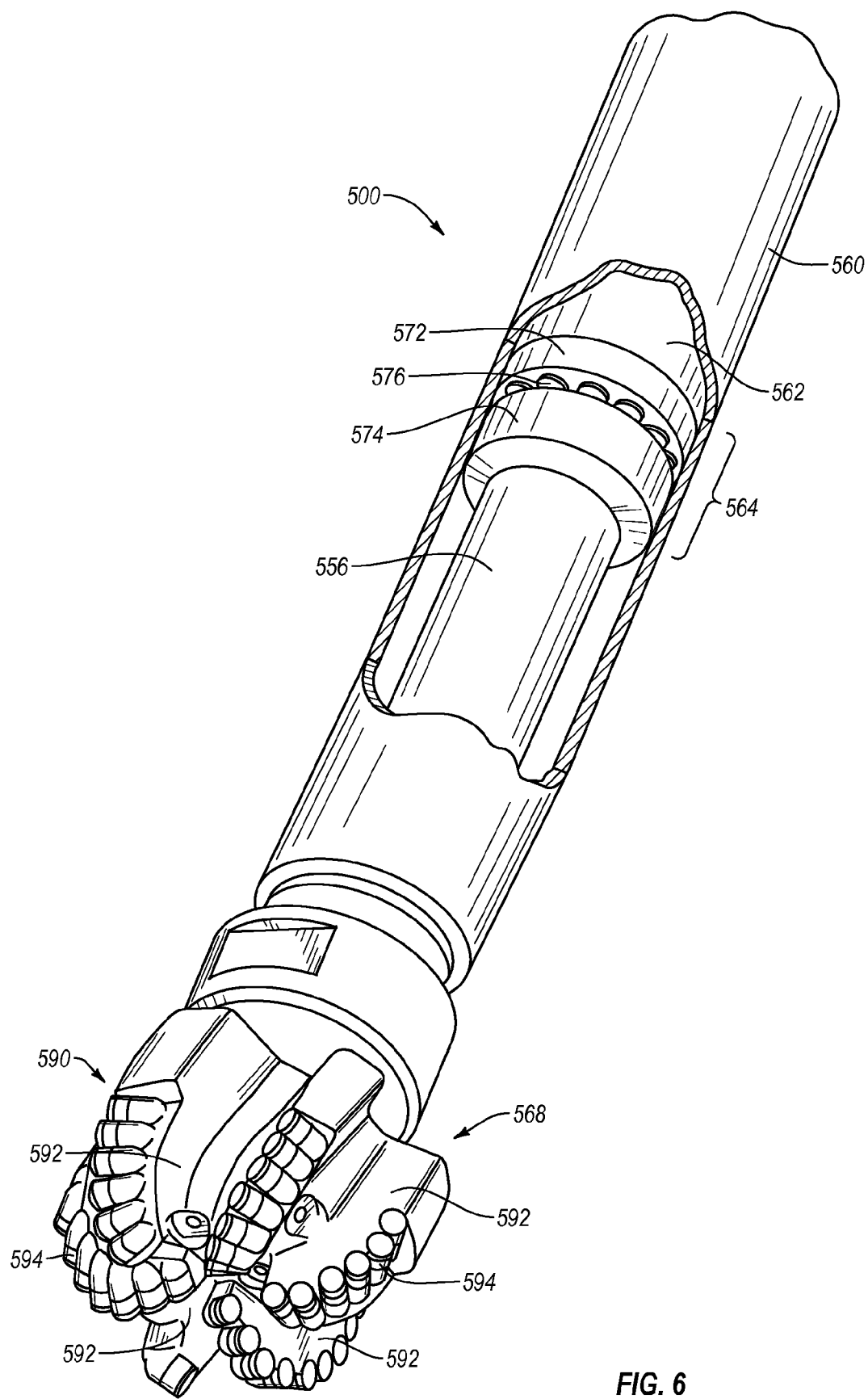
FIG. 6 is an isometric view of a subterranean drilling system according to an embodiment, which may employ any of the thrust-bearing and/or radial bearing apparatus embodiments disclosed herein.

Any of the embodiments for thrust-bearing apparatuses and radial bearing apparatuses discussed above may be used in a subterranean drilling system. FIG. 6 is a schematic isometric cutaway view of a subterranean drilling system 500 according to an embodiment. The subterranean drilling system 500 may include a housing 560 enclosing a downhole drilling motor 562 (i.e., a motor, turbine, or any other device capable of rotating an output shaft) that may be operably connected to an output shaft 556. A thrust-bearing apparatus 564 may be operably coupled to the downhole drilling motor 562. The thrust-bearing apparatus 564 may be configured as any of the previously described thrust-bearing apparatus embodiments. A rotary drill bit 568 may be configured to engage a subterranean formation and drill a borehole and may be connected to the output shaft 556. The rotary drill bit 568 is a fixed-cutter drill bit and is shown comprising a bit body 590 having radially-extending and longitudinally-extending blades 592 with a plurality of PDCs secured to the blades 592. However, other embodiments may utilize different types of rotary drill bits, such as core bits and/or roller-cone bits. As the borehole is drilled, pipe sections may be connected to the subterranean drilling system 500 to form a drill string capable of progressively drilling the borehole to a greater size or depth within the earth.

The thrust-bearing apparatus 564 may include a stator 572 that does not rotate and a rotor 574 that may be attached to the output shaft 556 and rotates with the output shaft 556. As discussed above, the thrust-bearing apparatus 564 may be configured as any of the embodiments disclosed herein. For example, the stator 572 may include a plurality of circumferentially-distributed superhard bearing elements 576 similar to the superhard bearing elements 120h shown and described in the thrust-bearing apparatus 200 of FIG. 3 as well as any of the superhard bearing elements 120-120g (FIGS. 1A-2F) and combinations thereof. The rotor 574 may include a plurality of circumferentially-distributed superhard bearing elements (not shown) such as shown and described in relation to FIGS. 1A-3. In addition, an embodiment of the subterranean drilling system 500 may include a radial-bearing apparatus (not shown), such as the radial-bearing apparatus 400 of FIG. 5. The radial-bearing apparatus also may include a rotor and a stator, as discussed above.

In operation, drilling fluid may be circulated through the downhole drilling motor 562 to generate torque and rotate the output shaft 556 and the rotary drill bit 568 attached thereto so that a borehole may be drilled. A portion of the drilling fluid may also be used to lubricate opposing bearing surfaces of the stator 572 and the rotor 574 and/or of the rotor and stator of the radial-bearing apparatus (not shown). When the rotor 574 is rotated, grooves of the superhard bearing elements of the rotor 574 may pump the drilling fluid onto the bearing surfaces of the stator 572 and/or the rotor 574, as previously discussed.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A bearing assembly, comprising:
a first plurality of superhard bearing elements distributed about an axis, each of the first plurality of superhard bearing elements having a substrate including an interfacial surface bonded to a superhard material including a superhard bearing surface, at least a substantial portion of the interfacial surface being substantially planar, the superhard material of at least some of the first plurality of superhard bearing elements exhibiting a maximum thickness that is at least 0.2 inch; and
a support ring structure coupled to the first plurality of superhard bearing elements.

2. The bearing assembly of claim 1, wherein a distance between the superhard bearing surface and the support ring is greater than the maximum thickness of superhard material.

3. The bearing assembly of claim 2, wherein the distance is between about 0.090 inch and about 0.500 inch.

4. The bearing assembly of claim 3, wherein the maximum thickness of the superhard material is between about 0.250 inch and about 0.312 inch.

5. The bearing assembly of claim 1, wherein each of the first plurality of superhard bearing elements includes a non-planar interface between superhard material and the substrate.

6. The bearing assembly of claim 1, wherein each of the first plurality of superhard bearing elements includes a stepped interface between superhard material and the substrate.

7. The bearing assembly of claim 6, wherein the stepped interface includes a first surface and a second surface, and a first thickness of the superhard material on the first surface is substantially less than a second thickness of the superhard material on the second surface.

8. The bearing assembly of claim 7, wherein the first thickness is between about 0.040 inch and about 0.080 inch.

9. The bearing assembly of claim 1, wherein:
a portion of a peripheral surface of at least one of the first plurality superhard bearing elements is formed by the superhard material; and
a surface area of the superhard bearing surface is no more than 4 times greater than a surface area of the portion of the peripheral surface formed by the superhard material.

10. The bearing assembly of claim 1, further comprising a second plurality of superhard bearing elements coupled to the support ring structure, the second plurality of superhard bearing elements having a superhard material that has a thickness that is less than 0.120 inch.

11. The bearing assembly of claim 1, wherein the superhard bearing surfaces of the first plurality of superhard bearing elements are convex or concave.

12. The bearing assembly of claim 1, wherein at least a majority of the interfacial surface is substantially planar.

13. The bearing assembly of claim 1, wherein substantially all of the interfacial surface is substantially planar.

14. A bearing apparatus, comprising:
a first bearing assembly including:
a first plurality of superhard bearing elements, each of the first plurality of superhard bearing elements including superhard material having a first superhard bearing surface; and
a second bearing assembly including:
a second plurality of superhard bearing elements, each of the second plurality of superhard bearing elements including a substrate including an interfacial surface bonded to a superhard material having a second superhard bearing surface positioned and oriented to slidingly engage the first superhard bearing surfaces of the first bearing assembly, at least a substantial portion of the interfacial surface being substantially planar, the superhard material of at least some of the second plurality of superhard bearing elements exhibiting a maximum thickness that is at least 0.2 inch; and
a second support ring structure coupled to the second plurality of superhard bearing.

15. The bearing assembly of claim 14, wherein the maximum thickness of the superhard material of the second plurality of superhard bearing elements is between about 0.250 inch and about 0.312 inch.

16. The bearing apparatus of claim 14, further comprising a gap between the first support ring structure and the second support ring structure, the gap having a height dimension that is between about 0.200 inch and about 1.00 inch.

17. The bearing apparatus of claim 14, wherein each of the one or more first bearing surfaces and the second superhard bearing surfaces is substantially planar.

18. The bearing apparatus of claim 14, wherein each of the first bearing surfaces is convex and each of the second bearing surfaces is concave.

19. The bearing apparatus of claim 14, wherein the second bearing assembly includes a third plurality of superhard bearing elements that include superhard material that has a thickness that is less than 0.120 inch.

20. The bearing apparatus of claim 14, wherein each of the second plurality of superhard bearing elements includes a substrate bonded to the superhard material, and wherein each of the second plurality of superhard bearing elements includes a non-planar interface between superhard material and the substrate.

21. The bearing apparatus of claim 14, wherein at least a majority of the interfacial surface is substantially planar.

22. The bearing apparatus of claim 14, wherein substantially all of the interfacial surface is substantially planar.

* * * * *

UNITED STATES PATENT AND TRADEMARK OFFICE
CERTIFICATE OF CORRECTION

PATENT NO. : 9,080,385 B2  Page 1 of 1
APPLICATION NO. : 13/899785
DATED : July 14, 2015
INVENTOR(S) : Gonzalez et al.

It is certified that error appears in the above-identified patent and that said Letters Patent is hereby corrected as shown below:

In the claims

In Column 23, Claim 15, Line 23, delete "assembly" and insert -- apparatus --, therefor.

Signed and Sealed this
Fifteenth Day of March, 2016

Michelle K. Lee
*Director of the United States Patent and Trademark Office*